United States Patent
Lee et al.

(10) Patent No.: US 12,071,564 B2
(45) Date of Patent: Aug. 27, 2024

(54) METHOD OF PRODUCING ELECTROCHROMIC COMPOSITION CAPABLE OF DIVERSIFYING COLORS

(71) Applicants: Hyundai Motor Company, Seoul (KR); Kia Motors Corporation, Seoul (KR)

(72) Inventors: Byung Hong Lee, Gyeonggi-do (KR); Tae Ho Jeong, Gyeonggi-do (KR); Young Chan Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 683 days.

(21) Appl. No.: 17/134,679

(22) Filed: Dec. 28, 2020

(65) Prior Publication Data

US 2021/0403730 A1 Dec. 30, 2021

(30) Foreign Application Priority Data

Jun. 24, 2020 (KR) .......................... 10-2020-0077010

(51) Int. Cl.
*C09D 5/29* (2006.01)
*C01G 19/00* (2006.01)
(Continued)

(52) U.S. Cl.
CPC .............. *C09D 5/29* (2013.01); *C01G 19/006* (2013.01); *C09D 1/00* (2013.01); *C09D 5/24* (2013.01);
(Continued)

(58) Field of Classification Search
CPC .. H04R 2225/51; H04R 27/02; G03G 15/234; C01G 19/006; C01G 19/00;
(Continued)

(56) References Cited

U.S. PATENT DOCUMENTS

| | | | |
|---|---|---|---|
| 7,428,114 B2 * | 9/2008 | Yu | G02B 3/00 359/822 |
| 7,897,203 B2 * | 3/2011 | Oriakhi | C09D 11/30 427/126.3 |
| 10,444,588 B2 * | 10/2019 | Yamada | C09K 9/02 |

FOREIGN PATENT DOCUMENTS

| KR | 10-2005-0096148 A | 10/2005 |
|---|---|---|
| KR | 10-2018-0088218 A | 8/2018 |

OTHER PUBLICATIONS

Chen, Gui-ju ; Title:A New Dual-purpose Agricultural Irrigation Bucket; published date Nov. 23, 2016 (Year: 2016).*

* cited by examiner

*Primary Examiner* — Jie Lei
(74) *Attorney, Agent, or Firm* — Fox Rothschild LLP

(57) ABSTRACT

Disclosed are a method of producing an electrochromic composition capable of diversifying colors, an electrochromic composition produced thereby, and an electrochromic device including the electrochromic composition. The electrochromic composition may be produced through a solution direct reaction using an electro-spray machine including two nozzles symmetrically inclined toward a central axis. The method may include preparing, respectively, a first coating composition comprising a first electrochromic compound and a second coating composition comprising a second electrochromic compound; loading, respectively, the first coating composition and the second composition into an electro-spray machine; spraying the first coating composition and the second coating composition under application of a voltage to the electro-spray device; and forming a electrochromic composition by reacting the first electrochromic compound with the second electrochromic compound during spraying.

12 Claims, 7 Drawing Sheets

(51) Int. Cl.
  *C09D 1/00* (2006.01)
  *C09D 5/24* (2006.01)
  *G01G 19/00* (2006.01)
  *G02F 1/1523* (2019.01)
  *G02F 1/155* (2006.01)
(52) U.S. Cl.
  CPC ............ *G02F 1/1523* (2013.01); *G02F 1/155* (2013.01); *C01P 2002/72* (2013.01); *C01P 2006/40* (2013.01); *C01P 2006/60* (2013.01)
(58) Field of Classification Search
  CPC .............. C01P 2002/72; C01P 2006/40; C01P 2006/60; C01P 2006/80; C09D 1/00; C09D 5/00; C09D 5/24; C09D 5/29; C09D 11/00; C09D 11/02; G02F 1/15; G02F 1/1523; G02F 1/155; G02F 1/1516; G02F 1/1524; G02F 1/1503; G02F 1/153; G02F 1/163; G02F 1/133305; G02F 2001/1555; C09K 9/02
  USPC ........ 359/265, 275, 254, 270, 900; 427/164, 427/108, 58, 126.1, 126.3, 162
  See application file for complete search history.

Cs$_2$SnX$_6$

Off ↑↓ On

I    Br    Cl    Br$_{6-y}$Cl$_y$

METHOD OF PRODUCING ELECTROCHROMIC COMPOSITION CAPABLE OF DIVERSIFYING COLORS

CROSS REFERENCE TO RELATED APPLICATION

The present application claims priority to Korean Patent Application No. 10-2020-0077010, filed Jun. 24, 2020, the entire contents of which is incorporated herein for all purposes by this reference.

TECHNICAL FIELD

The present invention relates to a method of producing an electrochromic composition capable of diversifying colors, an electrochromic composition produced thereby, and an electrochromic device including the electrochromic composition.

BACKGROUND

A smart window refers to a window that can freely control transmittance of solar light. In the past, most techniques for controlling transmittance of solar light have involved mounting of a film having a specific transmittance on a window. However, the smart window provides a high degree of convenience to a user while significantly increasing transmittance of solar light by developing a material that can freely control transmittance of solar light and is inserted into the window, which is advantageous over the conventional method of mounting the film.

The interest in passive smart windows that can simultaneously satisfy sensibility and functionality by reducing energy loss and providing a comfortable environment for consumers by freely controlling transmittance of light from outside has increased. This is a foundation technology that can find common application in various businesses such as transportation, information display, and architecture, and is currently being adopted for automobile privacy/security, transmissive projectors, and window panels for exhibition halls. In particular, a smart window for an automobile can provide an advanced convenience function because the smart window can induce a state transition with only a momentary operation on parts requiring an optical modulation effect in addition to a driver's seat side window, a passenger's seat side window, a sunroof, and a sun visor.

On the other hand, as an alternative to a smart window implementation method that is currently used, studies on suspended particle device (SPD) or polymer dispersed liquid crystal (PDLC) electrochromic devices composed of liquid crystal (LC) materials have been actively conducted. However, the problems of expensive materials, high cost due to the long manufacturing process time, blurring phenomenon depending on angle, and increased power consumption due to continuous power supply to maintain transparency are issues that must be solved. Additionally, conventional SPD and PDLC types have intrinsic limitations in diversifying colors due to their working principle, which functions as light values to make it go from clear to dark in a matter of seconds.

In the related art, studies on electrochromic materials having low viewing angle dependence, having low power consumption, and having transparency in an OFF state have been reported. For example, studies on an inorganic-type electrochromic systems composed of transition metal oxides such as tungsten ($WO_3$) and molybdenum ($MoO_3$) oxides, an electrochromic layer or ion storage layer, and an electrolyte layer have been actively conducted. However, these systems have disadvantages of process complexity, increased manufacturing cost, and slow response speed. These systems have another disadvantage that only a visibility blocking function is provided, and that it is difficult to continuously change transmittance and thus colors are limited.

The foregoing is intended merely to aid in the understanding of the background of the present invention, and is not intended to mean that the present invention falls within the purview of the related art that is already known to those skilled in the art.

SUMMARY

In one preferred aspect, provided is a method of producing an inorganic-type electrochromic composition that can be produced through a simple process by means of a solution direct reaction rather than a conventional solid direct reaction.

In another preferred aspect, provided is an electrochromic composition that may include a defect variant of perovskite type in which the halide is located at the corners of a cube and is connected via the tin atom from the Coulomb interactions between the particular ions, i.e., $Cs_2SnX_yZ_{6-y}$ wherein X and Z are each independently selected from the group consisting of I, Br, and Cl, and y is 0<y<6.

In one preferred aspect, provided is a simple electrochromic structural device that may include a universal single layer functioning as electrochromic layer, electrolyte, and ion storage layer, rather than a multi-layer device.

The objectives of the present invention are not limited to the aforementioned objectives. The objectives of the present invention will become more apparent by the following description, and may be implemented by means described in the claims and combinations thereof.

In aspect, provided is a method of preparing an electrochromic composition. The method may include: preparing, respectively, a first coating solution including a first electrochromic compound (S1) and a second coating solution including a second electrochromic compound (S2) (step 1); and loading, respectively, the first coating composition and the second composition into an electro-spray machine and spraying the first coating composition and the second coating composition under application of a voltage to the electro-spray device (step 2); and forming a electrochromic composition by reacting the first electrochromic compound with the second electrochromic compound during spraying (step 3).

The method may further include spraying the electrochromic composition to a solvent or a base material.

The electro-spray machine may include: a nozzle part including a first nozzle and a second nozzle that are located on the same line and are symmetrically inclined toward a central axis; a connection part connected to lower portions of the first and second nozzles; and a tip located at a lower portion of the connection part and through which the electrochromic composition is sprayed.

A first coating composition (S1) may be prepared by the following step including: dissolving an alkali metal compound is dissolved in distilled water and a mixture of water and an alcoholic solvent (e.g. ethanol, methanol, isopropyl alcohol).

The alkali metal compound may include CsX, and X may be I, Br, or Cl.

A second electrochromic compound (S2) may also be prepared by the following step including: admixing a tin compound in an alcoholic solvent (e.g. ethanol, methanol, isopropyl alcohol).

The tin compound may include one selected from the group consisting of $SnX_2$ and $SnX_4$, and X may be I, Br, or Cl.

In one preferred aspect, a molar concentration of the first electrochromic compound in the first coating composition may suitably range from about 0.1 M to about 10 M, and a molar concentration of the second electrochromic compound in the second coating composition may suitably range from about 0.1 M to about 10 M.

In a preferred aspect, a spraying rate of the first coating composition may be about 10 to 70 μl/m, and a spraying rate of the second coating composition may be about 10 to 70 μl/m.

In a preferred aspect, the applied voltage suitably may be about 8 to 16 kV.

In another aspect of the present invention, provided is an electrochromic composition produced by the method as described herein. The electrochromic composition may include $Cs_2SnX_yZ_{6-y}$, and each X and Z may be each independently selected from the group consisting of I, Br, and Cl, and y satisfies 0<y<6.

The electrochromic composition may be formed in a solution or a film.

In an aspect, provide is an electrochromic device that may include: an electrochromic layer including the electrochromic composition as described herein; and a transparent conductive layer located on one or each of opposite sides of the electrochromic layer.

According to various exemplary embodiments of the present invention, the electrochromic composition may be produced through a solution direct reaction using an electro-spray machine including two nozzles symmetrically inclined toward a central axis. As such, the electrochromic composition may be prepared easily compared to a conventional process. Therefore, solvent consumption may be reduced and the reaction rate and time may be reduced, thus improving economic efficiency of a process, and to improve efficiency of the process due to high yield.

Further, by preparing the electrochromic composition according to the present invention by varying the components, molar concentrations, and spraying rates of the first and second coating compositions, color diversification may be obtained, unlike in the case of a conventional electrochromic material.

Further, when the electrochromic device is manufactured by the use of an electrochromic layer including the electrochromic composition according to various exemplary embodiments of the present invention, the electrochromic device does not need to include an electrolyte layer, unlike a conventional device, and thus the electrochromic device may be manufactured to have a simple structure, while maintaining a memory function.

The effects of the present invention are not limited to the aforementioned effects. It should be understood that the effects of the present invention include all effects that can be inferred from the following description.

Other aspects of the invention are disclosed infra.

DETAILED DESCRIPTION

Figure 1:
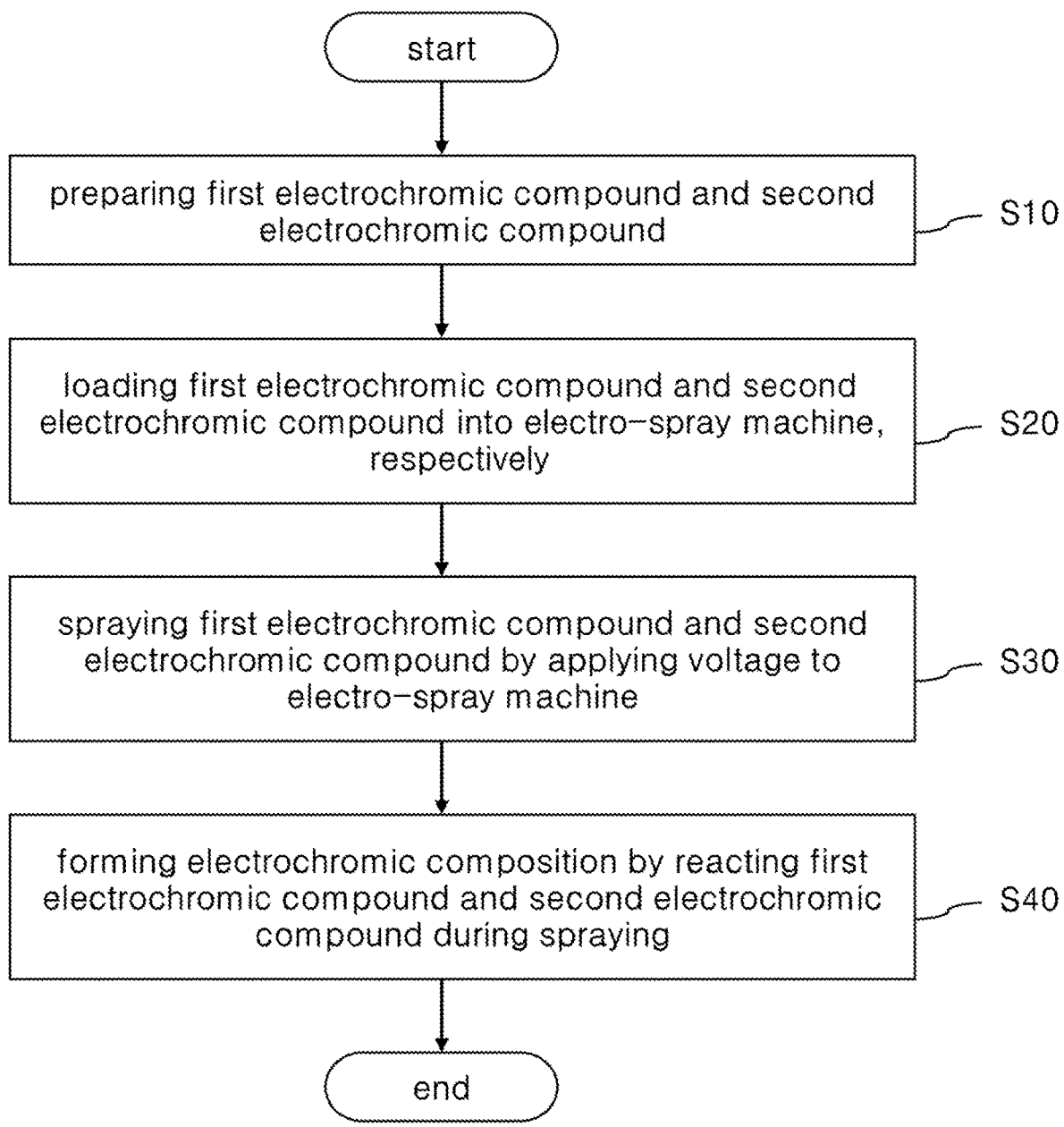
FIG. 1 shows an exemplary method of producing an exemplary electrochromic composition according to an exemplary embodiment of the present invention.

The above and other objectives, features, and other advantages of the present invention will be more clearly understood from the following detailed description when taken in conjunction with the accompanying drawings. However, the present invention may be embodied in many different forms and should not be construed as limited to the embodiments set forth herein. Rather, these embodiments are provided so that this disclosure will be thorough and complete, and will fully convey the scope of the invention to those skilled in the art.

The same reference numerals are used throughout the different drawings to designate the same or similar components. In the accompanying drawings, the sizes and relative sizes of layers and regions may be exaggerated for clarity. It will be understood that, although the terms first, second, etc. may be used herein to describe various elements, these elements should not be limited by these terms. These terms are only used to distinguish one element, from another element. For example, a first element discussed below could be termed a second element without departing from the teachings of the present invention. Similarly, the second element could also be termed the first element. As used herein, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. It will be also understood that when an element such as a layer, a film, a region, or a substrate is referred to as being "on" another element, it can be directly on the other element or intervening elements may also be present. In contrast, it will be understood that when such as a layer, a film, a region, or a substrate is referred to as being "under" another element, it can be directly under the other element or intervening elements may also be present.

Unless otherwise defined, all numbers, values and/or expressions referring to quantities of components, reaction conditions, polymer compositions, and formulations used herein are to be understood as modified in all instances by the term "about" as such numbers are inherently approximations that are reflective of, among other things, the various uncertainties of measurement encountered in obtaining such values.

Unless specifically stated or obvious from context, as used herein, the term "about" is understood as within a range of normal tolerance in the art, for example within 2 standard deviations of the mean. "About" can be understood as within 10%, 9%, 8%, 70, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such a range is continuous, and includes unless otherwise indicated, every value from the minimum value to and including the maximum value of such a range. Still further, where such a range refers to integers, unless otherwise defined, every integer from the minimum value to and including the maximum value is included.

In the context of this specification, where a range is stated for a parameter, it will be understood that the parameter includes every value within the stated range, inclusive of the stated endpoints of the range. For example, a range of "5 to 10" will be understood to include the values of 5, 6, 7, 8, 9, and 10 as well as any sub-range within the state range, such as to include the sub-range of 6 to 10, 7 to 10, 6 to 9, 7 to 9, etc., and inclusive of any value and range between the integers which is reasonable in the context of the range stated, such as 5.5, 6.5, 7.5, 5.5 to 8.5 and 6.5 to 9, etc. Further, for example, a range of "10% to 30%" will be understood to include the values 10%, 11%, 12%, 13%, etc. and all integers up to and including 30%, as well as any sub-range within the stated range, such as to include the sub-range of 10% to 15%, 12% to 18%, 20% to 30%, etc., and inclusive of any value and range between the integers which is reasonable in the context of the range stated, such as 10.5%, 15.5%, 25.5%, and the like.

Method of Producing Electrochromic Composition

FIG. 1 shows an exemplary method of producing an electrochromic composition according to an exemplary embodiment of the present invention. The method of producing the electrochromic composition may include: preparing a first respectively, a first coating composition including a first electrochromic compound S1 and a second coating composition including a second electrochromic compound S2 by each batch (S10); loading, respectively, the first coating composition S1 and the second coating composition S2 into an electro-spray machine (S20); spraying the first coating composition and the second coating composition under application of a voltage to the electro-spray machine (S30); and forming a electrochromic composition by reacting the first electrochromic compound in the first coating composition S1 with the second electrochromic compound in the second coating composition S2 during spraying (S40).

The step of preparing the first electrochromic compound S1 and the second electrochromic compound S2 (S10) may be a step of separately preparing the first coating composition S1 and the second coating composition S2. The first and second electrochromic compounds in the first and the second coating compositions (S1 and S2) may be general electrochromic compounds that can be used in the present invention, e.g., each independently, as an inorganic material, an alkali metal compound, a tin compound, transition metal oxides (TMOs), Prussian blue (PB), or metal phthalocyanines, and may be, as an organic material, viologens, buckminsterfullerene, or a conducting polymer. The transition metal oxides may include iridium, rhodium, ruthenium, tungsten, manganese, or cobalt, the Prussian blue may be an iron(III)hexacyanoferrate(II) system, and the metal phthalocyanines may be lutetium bis(phthalocyanine). The viologens may be a 4,4'-dipyridinium compound, the buckminsterfullerene may be C60 or C70 buckyball, and the conducting polymer may be an organic aromatic molecule such as pyrrole, aniline, thiophene, furan, and carbazole, but is not limited to including a specific component. However, in order to obtain an electrochromic composition including a defect variant of perovskite type capable of diversifying colors by a solution direct reaction, the first and second coating compositions may include, respectively, an alkali metal compound and a tin compound.

For example, the first electrochromic compound may include an alkali metal compound, and the second electrochromic compound may include a tin compound. The alkali metal compound may include one or more selected from the group consisting of LiX, NaX, KX, RbX, and CsX (X is I, Br, or Cl), but is not limited to including a specific component. For example, the alkali metal compound may preferably be CsX, which has a direct band gap and is non-toxic and economical as a solar cell device and a solid electrolyte. Further, the tin compound may include one or more selected from the group consisting of $SnX_2$ and $SnX_4$ (X is I, Br, or Cl), but is not limited to including a specific component.

The first coating composition S1 and the second coating composition S2 may be prepared by including the alkali metal compound or the tin compound, respectively, in order to obtain the electrochromic composition including a defect variant of perovskite type by a solution direct reaction using the electro-spray machine. When the respective coating are not separately prepared, the second coating composition S2 including the tin compound may precipitate when mixed with distilled water included in the first coating composition S1 and thus may not react with the first electrochromic compound in the first coating composition S1. The step of preparing the first coating composition S1 may include dissolving an alkali metal compound in distilled water and a mixture of water and alcoholic solvent (e.g. ethanol, methanol, isopropyl alcohol). The alkali metal compound may be the same as or different from the above described alkali metal compound. For example, after the alkali metal compound prepared above is completely dissolved in the distilled water, the mixture may be prepared by adding about 10 to 50 mL of the alcoholic solvent. The alcoholic solvent may include one or more selected from the group consisting of isopropyl alcohol (IPA), methanol (MeOH), and ethanol (EtOH). Thereafter, the mixture may be dispersed to prepare the first electrochromic compound. The mixture may be dispersed by means of stirring or sonication, but the dispersion method is not limited to a specific method. The molar concentration of the first electrochromic compound in the first coating composition S1 may range from about 0.1 M to about 10 M. Further, the step of preparing the second coating composition S2 may include dissolving a tin compound alcoholic solvent (e.g. ethanol, methanol, isopropyl alcohol). The tin compound may be the same as or different from the above described tin compound. The tin compound may be dissolved in alcoholic solvent. The alcoholic solvent may be the same as or different from the above described alcoholic solvent. In this case, when a tin compound that is not easily dissolved in the alcoholic solvent is generated, the step of preparing the second coating composition S2 may further include dissolving the tin compound in a small amount of dimethyl sulfoxide or dimethyl formamide. The molar concentration of the second electrochromic compound in the second coating composition S2 may range from about 0.1 M to about 10 M. When the molar concentrations of the first electrochromic compound S1 and the second electrochromic compound S2 are less than about 0.1 M, a tip clogging phenomenon may occur during spraying due to self-aggregation, which may limit continuous coating. On the other hand, when the molar concentrations thereof is greater than about 10 M, a phase separation phenomenon may occur due to excess molar concentration. Further, the first coating composition S1 and the second coating composition S2 may be sprayed at a molar concentration ratio of about 1.0:1.6. When the molar concentration ratio thereof is less than the above ratio, a desired structure (A2MX6 type) may not be generated due to excess of Cs. On the other hand, when the molar concentration ratio thereof is greater than the above ratio, reaction with ambient oxygen may occur due to a lack of Cs, thereby generating a by-product of $SnO_2$ which acts as an impurity.

As described above, by producing the electrochromic composition and by varying the components and the molar concentrations of the first and second electrochromic compounds in the first and second coating compositions S1 and S2, color diversification can be achieved, unlike in the case of a conventional electrochromic material.

Figure 2:
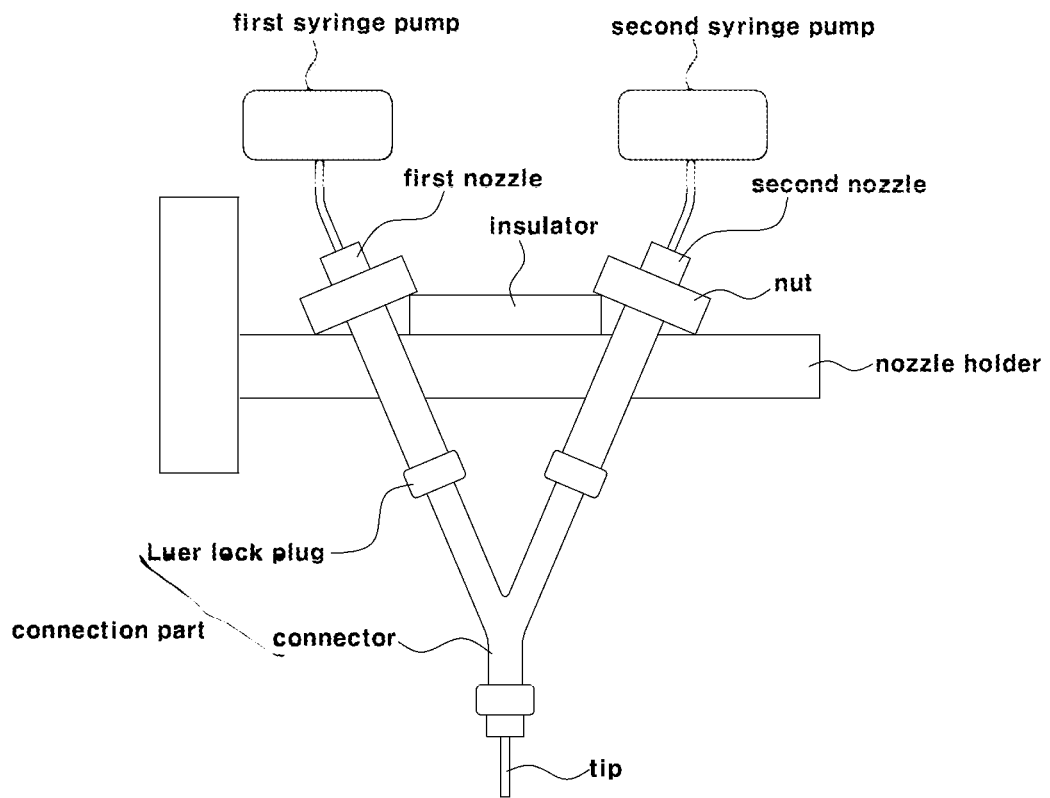
FIG. 2 shows an exemplary electro-spray machine according to an exemplary embodiment of the present invention.
Figure 3:
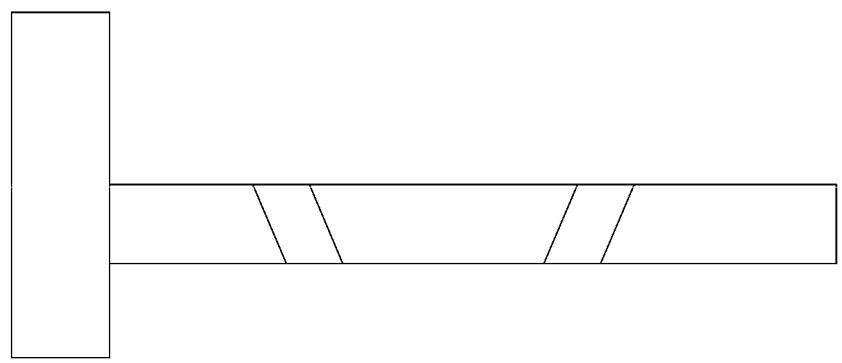
FIG. 3 shows an exemplary nozzle holder including holes that are located on the same line and are symmetrically inclined toward a central axis.

The step of loading the first coating composition S1 and the second coating composition S2 into the electro-spray machine (S20) may include a step of preparing the electro-spray machine capable of obtaining the electrochromic composition including a defect variant of perovskite type by a solution direct reaction, and of loading the first coating composition S1 and the second coating composition S2 into a first nozzle and a second nozzle, respectively. The first electrochromic compound in the first coating composition S1 and the second electrochromic compound in the second coating composition S2 may be the same as or different from those described above. FIG. 2 is a sectional view illustrating an electro-spray machine according to an exemplary embodiment of the present invention. The electro-spray machine may include a nozzle part; a connection part; and a tip. As shown in FIG. 3, the nozzle part may include a first nozzle and a second nozzle mounted in a nozzle holder including holes that are located on the same line and are symmetrically inclined toward a central axis. Each of the first nozzle and the second nozzle mounted in the inclined holes may be secured to the nozzle holder by a nut, and an insulator may be interposed and secured in a floating space between the nut and the nozzle holder. Further, different syringe pumps may be connected to upper portions of the respective first and second nozzles of the nozzle part through connection hoses. The first coating composition S1 and the second coating composition S2 may be loaded into the different syringe pumps, respectively. The nozzle part may be configured to spray the respective electrochromic compounds loaded into the syringe pumps to the connection part through the respective first nozzles and second nozzles so as to react the electrochromic compounds in the coating compositions with each other. The connection part may include a Luer lock plug connected to a lower portion of each of the first nozzle and the second nozzle of the nozzle part, and a three or four-way connector connected to the respective lower portions of the first and second nozzles to which the respective Luer lock plugs are connected. The connection part may be a portion where the first and second electrochromic compounds in the first and second coating compositions S1 and S2 react with each other during spraying. The tip may be located at a lower portion of the connection part to spray the electrochromic composition formed in the connector to a base material that can be produced in a form of a solution or a film. For example, in the method of producing the electrochromic composition as described herein, the electrochromic composition may be produced through a solution direct reaction using the electro-spray machine, and thus the electrochromic composition can be produced simply compared to a conventional process. Therefore, there is an advantage in that solvent consumption can be reduced, the reaction rate and time can be shortened, thus improving economic efficiency of a process, and efficiency of the process can be improved due to high yield.

The steps of spraying the first coating composition S1 and the second coating composition S2 (S30) and forming a electrochromic composition by reacting the first electrochromic compound in the first coating composition S1 with the second electrochromic compound in the second coating composition S2 (S40) may be steps of spraying the first and second electrochromic compounds S1 and S2 under application of a voltage to the electro-spray machine and forming a electrochromic composition by reacting the first electrochromic compound with the second electrochromic compound during spraying. The first electrochromic compound in the first coating composition S1 and the second electrochromic compound in the second coating composition S2 may react in the connector constituting the connection part, respectively through the first nozzle and the second nozzle constituting the nozzle part, in the electro-spray machine to form the electrochromic composition. The applied voltage may be about 3 to 25 kV, preferably about 8 to 16 kV. When the applied voltage is less than about 8 kV, a uniform coating may be difficult to obtain because a sufficient voltage for coating may not be given and a mixture may fall in a drop form. On the other hand, when the applied voltage is greater than about 16 kV, the mixture may be spread due to high voltage, and there may be a risk of fire due to sparks. Further, the spraying rate of the first electrochromic compound in the first coating composition S1 may be about 10 to 70 μl/m, and the spraying rate of the second electrochromic compound in the second coating composition S2 may be about 10 to 70 μl/m. When the spraying rates of the first coating composition S1 and the second coating composition S2 are less than about 10 μl/m, a solvent may be rapidly vaporized due to a relatively high voltage compared to a low feeding rate, resulting in CsO particles. On the other hand, when the spraying rates thereof is greater than about 70 μl/m, an excessive amount of the solvent may be included, causing a transition to a wet state. As described above, by producing the electrochromic composition by varying the voltage application conditions or the spraying rates of the first and second electrochromic compounds, as well as the components and concentrations, color diversification may be achieved, unlike in the case of a conventional electrochromic material.

Further, the electrochromic composition may be produced in a liquid phase or a solid phase. To this end, the method may further include spraying the electrochromic composition to a solvent or a base material. In detail, the solvent may be a protic solvent or an aprotic solvent, or an aprotic solvent, or particularly, dichloromethane (DCM), N-methylpyrrolidone, acetone, dimethylfomamide (DMF), acetonitrile (ACN), or dimethyl sulfoxide (DMSO) among aprotic solvents, but is not limited to a specific solvent. In addition, the base material is not particularly limited as long as the base material does not denature the electrochromic composition by causing a specific reaction with the electrochromic composition. Preferably, the base material is a non-conductive glass or a base material filled with an anti-solvent (e.g., toluene, hexane, benzene, chloroform, diethyl ether, and the like) insoluble in an aprotic solvent, but is not limited to a specific type. As described above, according to various exemplary embodiments of the present invention, the electrochromic composition may be produced in various forms through a simple process according to the above method.

Electrochromic Composition and Electrochromic Device

An electrochromic composition according to an embodiment of the present invention may be produced as described above, preferably an electrochromic composition including a defect variant of perovskite type capable of diversifying colors, more preferably $Cs_2SnX_yZ_{6-y}$, wherein X and Z are each independently selected from the group consisting of I, Br, and Cl, and y satisfies 0<y<6. Further, the electrochromic composition may be formed in a solution or a film, depending on a final spraying method according to the above method. That is, due to the fact that the electrochromic composition is produced through a solution direct reaction using an electro-spray machine, the electrochromic composition including a defect variant of perovskite type capable of color diversification can be easily produced compared to a conventional process. As such, the solvent consumption may be reduced, the reaction rate and time may be reduced, thus improving economic efficiency of a process, and efficiency of the process can be improved due to high yield. Further, by producing the electrochromic composition and by varying the components, molar concentrations, and spraying rates of the first and second electrochromic compounds, as described herein, color diversification may be achieved, unlike in the case of a conventional electrochromic material.

An electrochromic device according to various exemplary embodiments of the present invention may include an electrochromic layer including the electrochromic composition, and a transparent conductive layer located on one or each of opposite sides of the electrochromic layer. The transparent conductive layer may be a general transparent conductive layer that can be used in the present invention, e.g., indium tin oxide (ITO), fluorine doped tin oxide glass (FTO), Al doped ZnO (AZO), a lead-free and flexible material, or the like, but is not limited to including a specific component. As described above, the electrochromic device according to various exemplary embodiments of the present invention does not need to include an electrolyte layer, unlike a conventional inorganic-type device, and thus the electrochromic device may be manufactured with a simple structure, while maintaining a memory function.

EXAMPLE

Hereinafter, the present invention will be described in more detail through specific examples. The following examples are only examples for helping the understanding of the present invention, and the scope of the present invention is not limited thereto.

Example 1-1: Electrochromic Composition ($Cs_2SnI_6$) Produced by Electro-Spray Machine (S10) A first electrochromic compound S1 was prepared as follows. In detail, CsI was prepared as an alkali metal compound. Then, 1 g of CsI was dissolved in 0.1 to 2 mL of distilled water, and a mixture of water and 10 to 50 mL of an alcoholic solvent, e.g., ethanol (EtOH), methanol (MeOH), and isopropyl alcohol (IPA), and finally 1 to 20 M of the first electrochromic compound S1 including CsI was prepared. Then, the mixture was dispersed by means of stirring or sonication, and finally, 1 to 20 M of the first electrochromic compound including CsI was prepared. A second electrochromic compound S2 was separately prepared as follows. Because precipitation occurs through reaction with $H_2O$ when $H_2O$ is added, spraying may not be carried out in a mixed state. In detail, 5 to 10 wt % of $SnI_4$ was prepared as a tin compound. Then, the tin compound is dissolved in 10 to 50 mL of an alcoholic solvent, e.g., IPA, MeOH, and EtOH, and finally, 0.1 to 16 M of the second electrochromic compound S2 including $SnI_4$ was prepared. As a result, the molar ratio of CsI included in the first electrochromic compound S1 to $SnI_4$ included in the second electrochromic compound S2 was 1:1.6.

(S20 and S30) An electro-spray machine was prepared, the electro-spray machine including a nozzle part including a first nozzle and a second nozzle that were located on the same line and were symmetrically inclined toward a central axis, a connection part connected to lower portions of the first and second nozzles, and a tip located at a lower portion of the connection part and through which an electrochromic composition was sprayed. Then, the prepared first electrochromic compound S1 and second electrochromic compound S2 were respectively loaded into first and second syringe pumps respectively connected to the first and second nozzles. Then, a voltage of about 8 to 20 kV was applied to the electro-spray machine and a distance between tip and collector was 10 to 20 cm. The material size may be controlled through the heights of the tip and the collector of the electro-spray machine and electric power to spray the first electrochromic compound S1 and the second electrochromic compound S2 at a spraying rate of 25 to 70 μl/m.

(S40) The first and second electrochromic compounds S1 and S2 were sprayed to a connector included in the connection part and reacted to form an electrochromic composition. The electrochromic composition was sprayed to conductive glass, aluminum foil, or a metal base to finally produce an electrochromic composition having a film form.

Example 1-2: Electrochromic Composition ($Cs_2SnI_6$) Produced by Electro-Spray Machine Compared to Example 1-1, an electrochromic composition was produced in the same manner as in Example 1-1 except that the molar ratio of CsI included in a first electrochromic compound S1 to $SnI_4$ included in a second electrochromic compound S2 was 1:2.

Example 2-1 to Example 2-2: Electrochromic Composition ($Cs_2SnI_{6-y}Br_y$) Produced by Electro-Spray Machine Compared to Example 1, electrochromic compositions were produced in the same manner as in Example 1-1 except that the molar ratio of CsI included in a first electrochromic compound S1 to $SnBr_4$ included in a second electrochromic compound S2 was 1:1 to 1.6 (Example 2-1), and the molar ratio of CsBr included in a first electrochromic compound S1 to $SnI_4$ included in a second electrochromic compound S2 was 1:1.7 to 2 (Example 2-2).

Example 3-1 to Example 3-4: Electrochromic Composition ($Cs_2SnI_{6-y}Cl_y$) Produced by Electro-Spray Machine Compared to Example 1, electrochromic compositions were produced in the same manner as in Example 1-1 except that the molar ratio of CsCl included in a first electrochromic compound S1 to $SnI_4$ included in a second electrochromic compound S2 was 1:1 to 1.6 (Example 3-1), and the molar ratio of CsCl included in a first electrochromic compound S1 to $SnI_4$ included in a second electrochromic compound S2 was 1:1.7 to 2 (Example 3-2).

Further, compared to Example 1-1, an electrochromic composition was produced in the same manner as in Example 1-1 except that the molar ratio of CsI included in a first electrochromic compound S1 to $SnCl_2(S)$ included in a second electrochromic compound S2 was 1:1 to 1.6 (Example 3-3). Further, compared to Example 1-1, an electrochromic composition was produced in the same manner as in Example 1-1 except that the molar ratio of CsI included in a first electrochromic compound S1 to $SnCl_4(l)$ included in a second electrochromic compound S2 was 1:1.7 to 2 (Example 3-4).

Example 4-1 to Example 4-2: Electrochromic Composition ($Cs_2SnBr_{6-y}Cl_y$) Produced by Electro-Spray Machine Compared to Example 1-1, an electrochromic composition was produced in the same manner as in Example 1-1 except that the molar ratio of CsBr included in a first electrochromic compound S1 to $SnCl_2(S)$ included in a second electrochromic compound S2 was 1:1 to 1.6 (Example 4-1). Further, compared to Example 1-1, an electrochromic composition was produced in the same manner as in Example 1-1 except that the molar ratio of CsBr included in a first electrochromic compound S1 to $SnCl_4(l)$ included in a second electrochromic compound S2 was 1:1.7 to 2 (Example 4-2).

Example 5-1 to Example 5-2: Electrochromic Composition ($Cs_2SnCl_6$) Produced by Electro-Spray Machine Compared to Example 1-1, an electrochromic composition was produced in the same manner as in Example 1-1 except that the molar ratio of CsCl included in a first electrochromic compound S1 to $SnCl_2(S)$ included in a second electrochromic compound S2 was 1:1 to 1.6 (Example 5-1). Further, compared to Example 1-1, an electrochromic composition was produced in the same manner as in Example 1-1 except that the molar ratio of CsCl included in a first electrochromic compound S1 to $SnCl_4(l)$ included in a second electrochromic compound S2 was 1:1.7 to 2 (Example 5-2).

Examples 6-1 to 6-4: Electrochromic Device Including Electrochromic Composition Produced According to the Present Invention An electrochromic device (Example 6-1) including an electrochromic layer including the electrochromic composition of Example 1-1, and a transparent conductive layer was produced. In detail, the transparent conductive layer including indium tin oxide (ITO), fluorine doped tin oxide glass (FTO), Al doped ZnO (AZO), a lead-free and flexible material, or the like was placed on each of opposite sides of the electrochromic layer to produce the electrochromic device.

Further, compared to Example 6-1, an electrochromic device (Example 6-2) was produced in the same manner as in Example 6-1 except that an electrochromic layer includes an electrochromic composition including $Cs_2SnBr_6$ instead of $Cs_2SnI_6$.

Further, compared to Example 6-1, an electrochromic device (Example 6-3) was produced in the same manner as in Example 6-1 except that an electrochromic layer includes an electrochromic composition including $Cs_2SnCl_6$ instead of $Cs_2SnI_6$.

Further, compared to Example 6-1, an electrochromic device (Example 6-4) was produced in the same manner as in Example 6-1 except that an electrochromic layer includes an electrochromic composition including $Cs_2SnBr_{6-y}Cl_y$ (0<y<6) instead of $Cs_2SnI_6$.

Comparative Example 1-1 to Comparative Example 1-6: Electrochromic Composition Produced by Solution Reaction By a method used to form general perovskite-type system materials, 2 M of CsI and 1 M of $SnI_4$ were mixed in DMSO and reacted (Comparative Example 1-1). 2 M of CsBr and 1 M of $SnI_4$ were mixed in DMSO and reacted (Comparative Example 1-2). 2 M of CsCl and 1 M of $SnI_4$ were mixed in DMSO and reacted (Comparative Example 1-3). 1 M of CsBr and 1 to 1.6 M of $SnCl_2$ were mixed in DMSO and reacted (Comparative Example 1-4). 1 M of $CsCl_2(S)$ and 1 to 1.6 M of HCl(l) were mixed in DMSO and reacted (Comparative Example 1-5)). 1 M of $CsCl_4(l)$ and 1 to 1.6 M of HCl(l) were mixed in DMSO and reacted (Comparative Example 1-6). Then, the resulting reactants were purified and filtered to finally obtain electrochromic compositions.

Comparative Example 2-1 to Comparative Example 2-3: Electrochromic Composition Produced By Grinding Reaction CsI powder and $SnI_4$ powder were prepared at a molar ratio of 1:1 to 1.6 (Comparative Example 2-1), and CsI powder and $SnICl_2$ powder were prepared at a molar ratio of 1:1 to 1.6 (Comparative Example 2-2), and 1 g of CsI and 1 g of $SnI_4$ were prepared (Comparative Example 2-3), followed by mixing using a mortar for about 1 hour to produce electrochromic compositions.

Comparative Example 3-1 to Comparative Example 3-2: Electrochromic Composition Produced by Solid Reaction CsI powder and $SnI_4$ powder were prepared at a molar ratio of 1:1 to 1.6 (Comparative Example 3-1), and 1 g of CsBr and 1 g of $SnBr_4$ (Comparative Example 3-2) were prepared, followed by a solid reaction to produce electrochromic compositions.

Experimental Example 1: Comparison in Efficiency of Preparation Methods of Electrochromic Compositions Depending on Reaction Type Used in Each Preparation Method

TABLE 1

|  | Time | Temperature(° C.) | Yield | Purity | Difficulty level | Solvent consumption | Selectivity |
|---|---|---|---|---|---|---|---|
| Comparative Example 3 | >24 h | <250 | 93% | High | High | Non | Low |
| Comparative Example 2 | >1 h | 25 | 90% | Low | Easy | Non | Low |
| Comparative Example 1-1 | >2 h | 25 | 92% | High | Medium | High | High |
| Example 1-1 | >10 min | 25 | 95% | High | Easy | Small | High |

As shown in Table 1 above, compared to a solution reaction, a grinding reaction, and a solid reaction used in Comparative Examples, when the electrochromic composition according to exemplary embodiments of the present invention was produced through a solution direct reaction using the electro-spray machine, an high-purity electrochromic composition without impurities could be obtained with a high yield within a short period of time at room temperature. Further, the production method was relatively easy to carry out, selectivity was high, and solvent consumption was the smallest. Particularly, due to the fact that the electrochromic composition was produced through the solution direct reaction using the electro-spray machine including two nozzles, the electrochromic composition can be easily produced compared to a conventional process. As such, solvent consumption can be reduced, the reaction rate and time can be shortened, thus improving economic efficiency of a process, and efficiency of the process can be improved due to high yield.

Experimental Example 2: Confirmation of Electrochromic Efficiencies of Electrochromic Compositions Depending on Reaction Type Used in Each Production Method Measurement of electrochromic efficiencies was made for the electrochromic compositions produced in Examples 3-3 and 3-4, Examples 4-1 and 4-2, and Examples 5-1 and 5-2; and the electrochromic compositions produced in Comparative Examples 1-4 to 1-6, Comparative Examples 2-2 and 2-3, and Comparative Examples 3-1 and 3-2. The results are illustrated in Table 2 below.

TABLE 2

| Composition | Reaction | Example | Electrochromic efficiency $T_{bleached}$ | $T_{colored}$ | η (%) | Repetition & Memory effect |
|---|---|---|---|---|---|---|
| $Cs_2SnI_6$(s) | CsI (s) + $SnI_4$ (s) + HI (l) | Comparative Example 3-1 | 79.79 | 66.95 | 7.62 | ○ |
| $Cs_2SnI_{6-y}Cl_y$ (s) | CsI (s) + $SnCl_2$ (s) | Comparative Example 2-2 | 77.79 | 41.23 | 27.57 | ○ |
|  | CsI (s) + $SnCl_2$ (s) | Example 3-3 | 84.36 | 15.16 | 74.5 | ○ |
|  | CsI (s) + $SnCl_4$ (l) | Example 3-4 | 84.36 | 13.97 | 78.1 | ○ |
| $Cs_2SnBr_6$(s) | CsBr (s) + $SnBr_4$ (l) + HBr (l) | Comparative Example 3-2 | 86.0 | 48.28 | 25.07 | ○ |
| $Cs_2SnBr_{6-y}Cl_y$ (s) | CsBr (s) + $SnCl_2$ (s) | Comparative Example 1-4 | 86.08 | 25.23 | 53.42 | ○ |
|  | CsBr (s) + $SnCl_2$ (s) | Example 4-1 | 86.32 | 3.38 | 140.6 | ○ |
|  | CsBr (s) + $SnCl_4$ (l) | Example 4-2 | 86.02 | 4.08 | 132.39 | ○ |
| $Cs_2SnCl_6$ (s) | $Cs_2CO_3$(s) + $SnCl_2$(s) | Comparative Example 2-3 | 85.85 | 70.02 | 8.85 | ○ |
|  | $Cs_2CO_3$(s) + $SnCl_2$(s) + HCl (l) | Comparative Example 1-5 | 85.81 | 36.53 | 37.09 | ○ |
|  | $Cs_2CO_3$(s) + $SnCl_4$(l) + HCl (l) | Comparative Example 1-6 | 85.48 | 31.05 | 43.98 | ○ |
|  | CsCl(s) + $SnCl_2$(s) | Example 5-1 | 86.05 | 10.96 | 89.49 | ○ |
|  | CsCl(s) + $SnCl_4$(s) | Example 5-2 | 85.98 | 9.01 | 97.97 | ○ |
| ** ES spec. (Dimming condition of general reflection coating. 70%à20% at least 6 seconds) | | | 70 | 20 | 54.4 | |
| *** Dimming condition expectation value (alone) in Lab scale | | | 88 | 10 | 94.44 | |

※Sample condition- cathode & anode: ITO coating glass (1.1 T), Size = 5 cm x 2 cm, Gap thickness = 80 μm, Voltage = 3.6 V As shown in Table 2, electrochromic efficiencies η (0%) of the electrochromic compositions produced by the method according to the present invention were significantly higher than those of the electrochromic compositions produced in Comparative Examples. Therefore, the electrochromic compositions produced by the method according to exemplary embodiments of the present invention could be easily produced compared to a conventional process, and thus solvent consumption was reduced, the reaction rate and time was shortened, thus improving economic efficiency of a process, efficiency of the process was improved due to high yield, and electrochromic efficiency was high.

Figure 4:
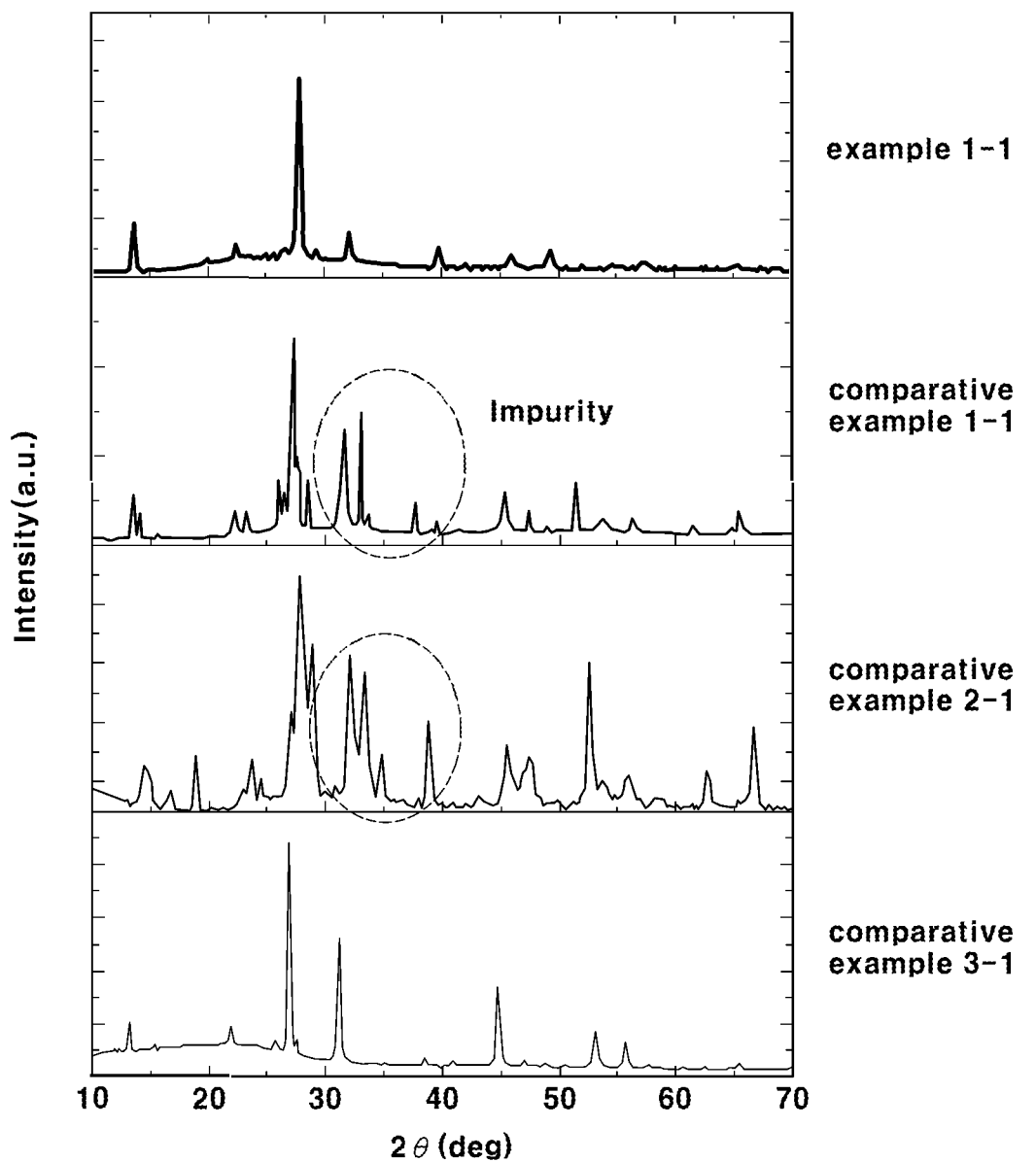
FIG. 4 shows XRD data of exemplary electrochromic compositions produced in Example 1-1, Comparative Example 1-1, Comparative Example 2-1, and Comparative Example 3-1.

Experimental Example 3: Comparison in XRD Data of Electrochromic Compositions Depending on Reaction Type Used in Each Preparation Method XRD data of each of the electrochromic compositions produced in Example 1-1, Comparative Example 1-1, Comparative Example 2-1, and Comparative Example 3-1 was measured to determine a data value according to purity. FIG. 4 is a graph illustrating the XRD data of each of the electrochromic compositions produced in Example 1-1, Comparative Example 1-1, Comparative Example 2-1, and Comparative Example 3-1. As such, a high-purity composition without impurities was formed in the electrochromic composition produced in Example 1-1. However, particularly in the electrochromic compositions produced in Comparative Example 1-1 and Comparative Example 2-1, it was difficult to form high-purity compositions due to presence of impurities.

Experimental Example 4: Determination of Color Diversification of Electrochromic Compositions Depending on Reaction Type Used in Each Preparation Method It was determined whether color diversification was possible by varying the components and amounts of the electrochromic compositions of Comparative Examples 1-1 to 1-3, the electrochromic compositions of Examples 2-1 to 2-2, and the electrochromic compositions of Examples 3-1 to 3-2.

Figure 5:
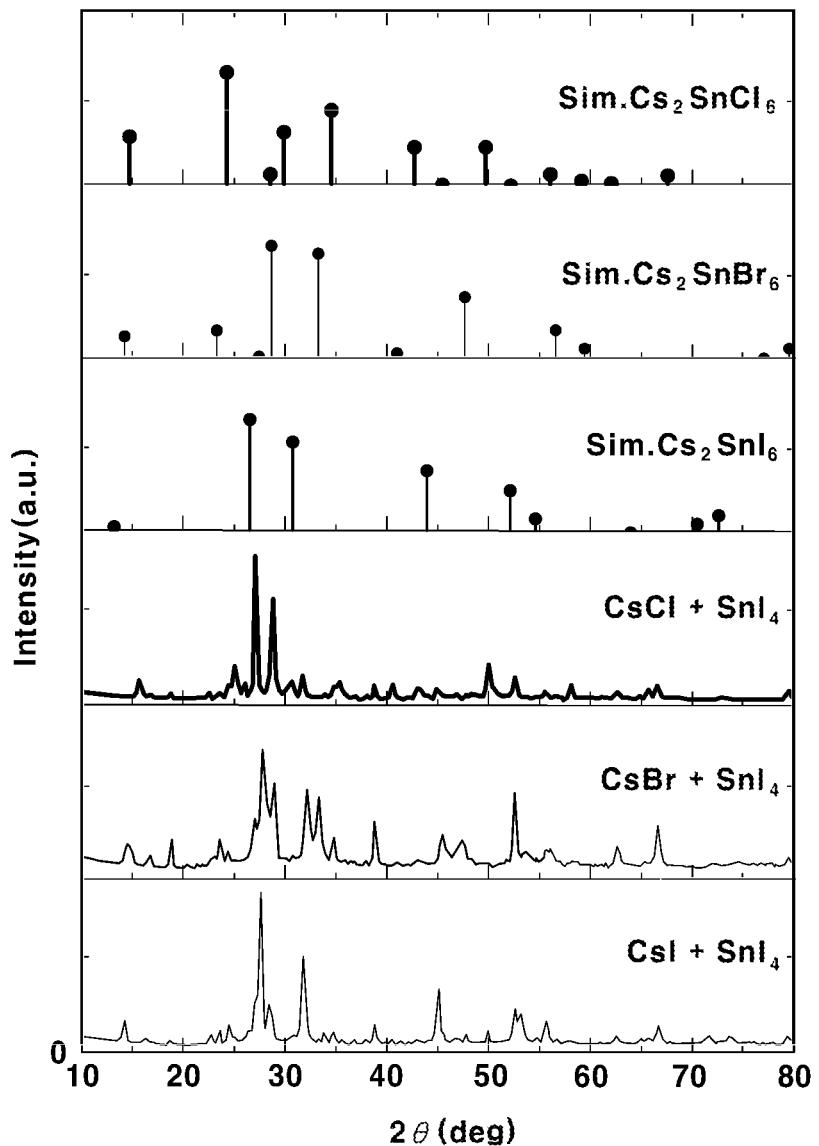
FIG. 5 shows determining color diversification of the electrochromic compositions of Comparative Examples 1-1 to 1-3 using XRD data.
Figure 6A:
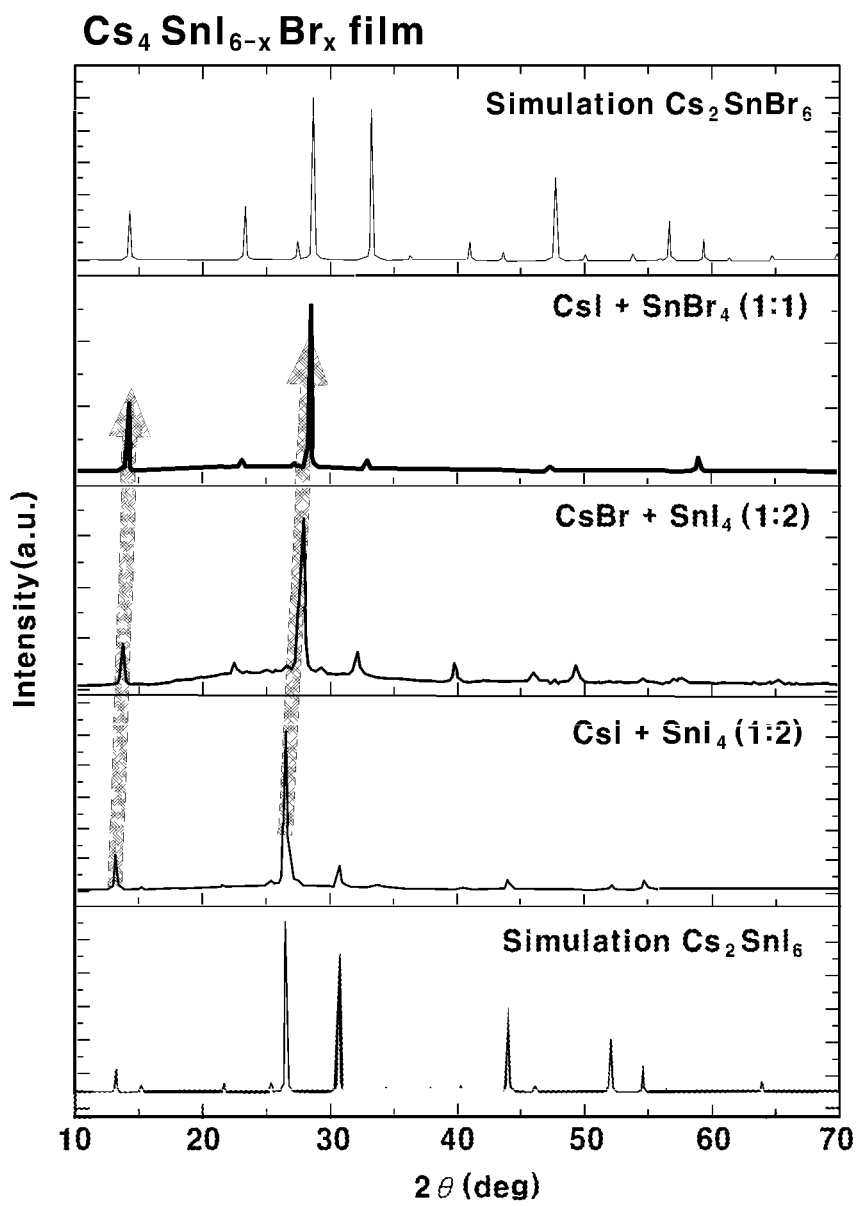
FIG. 6A shows determining color diversification of the electrochromic compositions of Example 2-1 to Example 2-2 using XRD data.
Figure 6B:
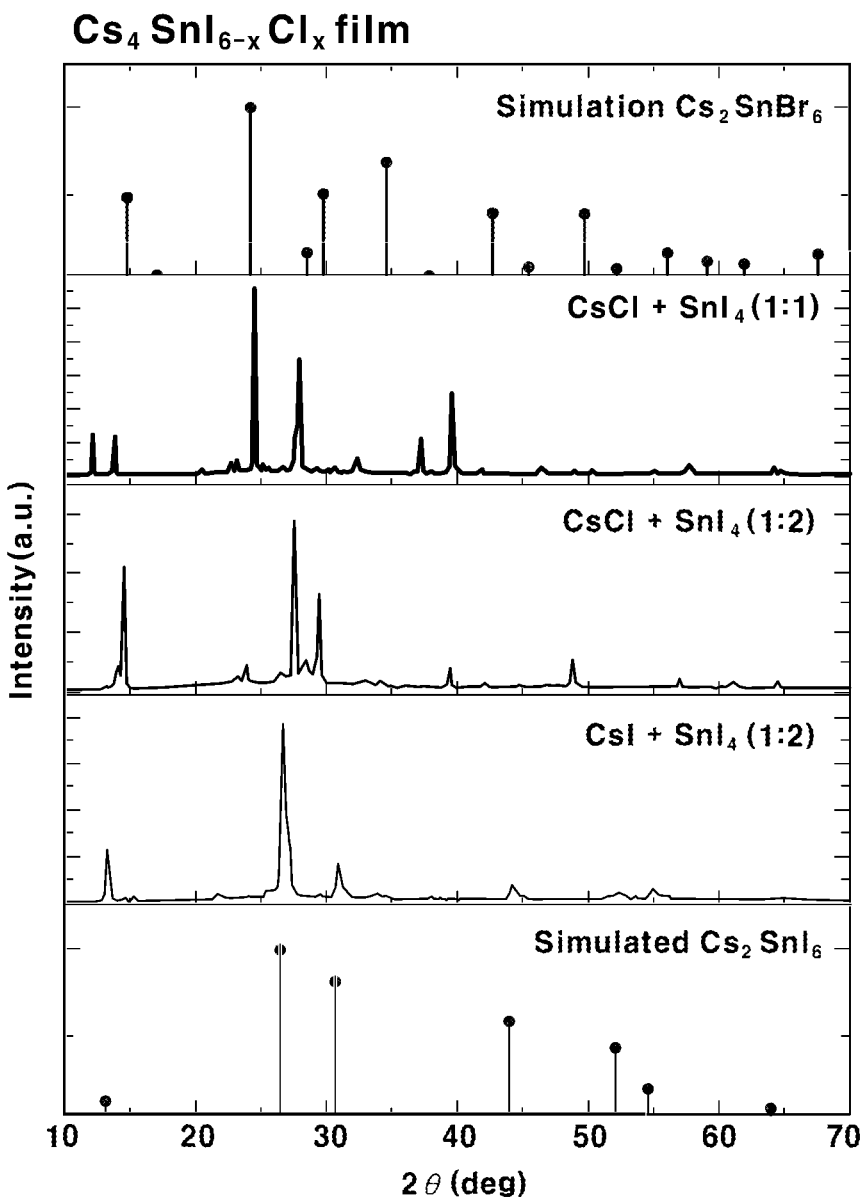
FIG. 6B is a graph determining color diversification of the electrochromic compositions of Example 3-1 to Example 3-2 using XRD data.

FIG. 5 shows color diversification of the electrochromic compositions of Comparative Examples 1-1 to 1-3 using XRD data. Further, FIG. 6A and FIG. 6B are graphs respectively determining color diversification of the electrochromic compositions of Example 2-1 to Example 2-2 and color diversification of the electrochromic compositions of Example 3-1 to Example 3-2, using XRD data. As compared to peak shifts of the electrochromic compositions of Comparative Examples 1-1 to 1-3, changes in peak shifts of the electrochromic compositions of Examples 2-1 to 2-2 and the electrochromic compositions of Example 3-1 to 3-2 were greater. By producing the electrochromic compositions according to exemplary embodiments of the present invention by varying the components, molar concentrations, and the like of the first and second electrochromic compounds, color diversification can be achieved, unlike in the case of an electrochromic material produced by a conventional method.

Experimental Example 5: Confirmation of Memory Function and Color Diversification of Electrochromic Device Including Electrochromic Composition Produced According to the Present Invention A memory function and color diversification of the electrochromic devices manufactured in Examples 6-1 to 6-4 were confirmed.

Figure 7:
FIG. 7 shows a memory function of an exemplary electrochromic device manufactured according to Example 6-3.
Figure 8:
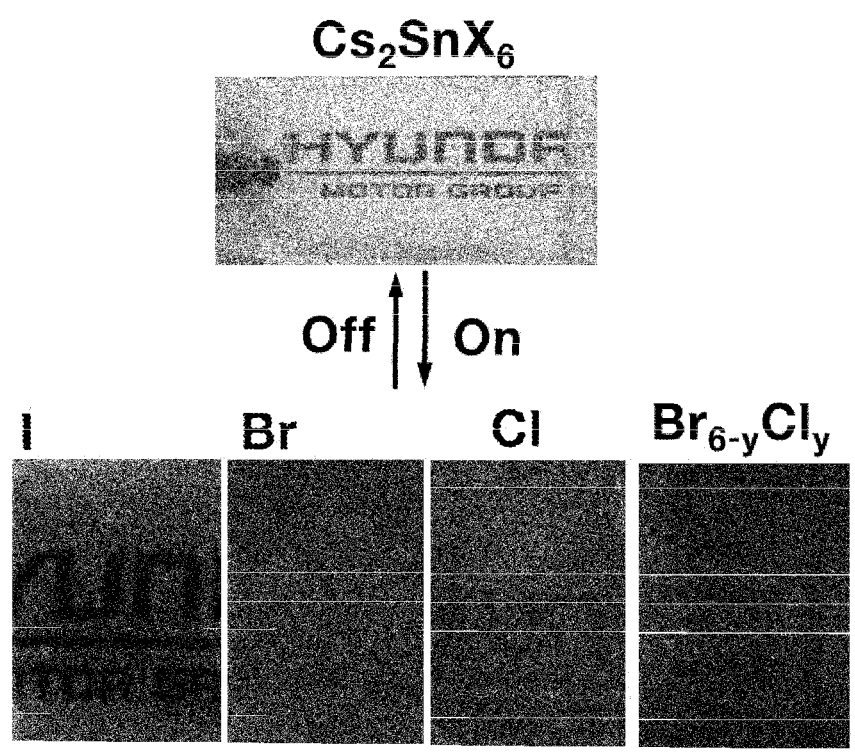
FIG. 8 shows color diversification of exemplary electrochromic devices manufactured according to Examples 6-1 to 6-4.

As a result, as illustrated in FIG. 7, the electrochromic device according to exemplary embodiments of the present invention, which has a simple structure compared to an electrochromic device including a conventional inorganic material, maintained color without application of a constant voltage, thus having a memory function. Further, as shown in FIG. 8, the electrochromic compositions included various defect variants of perovskite type obtained through various changes in the composition of halogen, and thus implementation of various colors was possible. Therefore, the electrochromic devices according to various exemplary embodiments of the present invention do not need to include electrolyte layers, unlike a conventional device, and thus the electrochromic devices can be manufactured with a simple structure, while maintaining a memory function and implementing various colors.

What is claimed is:

1. A method of producing an electrochromic composition, comprising:
preparing, respectively, a first coating composition comprising a first electrochromic compound and a second coating composition comprising a second electrochromic compound;
loading, respectively, the first coating composition and the second composition into an electro-spray machine;
spraying the first coating composition and the second coating composition under application of a voltage to the electro-spray machine; and
forming an electrochromic composition by reacting the first electrochromic compound with the second electrochromic compound during spraying,
wherein a molar concentration of the first electrochromic compound in the first coating composition ranges from 0.1 M to 10 M, and
wherein a molar concentration of the second electrochromic compound in the second coating composition ranges from 0.1 M to 10 M.

2. The method of claim 1, further comprising:
spraying the electrochromic composition to a solvent or a base material.

3. The method of claim 1, wherein the electro-spray machine comprises:
a nozzle part comprising a first nozzle and a second nozzle that are located on the same line and are symmetrically inclined toward a central axis;
a connection part connected to lower portions of the first and second nozzles; and
a tip located at a lower portion of the connection part and through which the electrochromic composition is sprayed.

4. The method of claim 1, wherein the preparing the first coating composition comprises:
dissolving an alkali metal compound in distilled water and a mixture of water and an alcoholic solvent.

5. The method of claim 4, wherein the alkali metal compound comprises CsX, and X is one selected from the group consisting of I, Br, Cl and combinations thereof.

6. The method of claim 1, wherein the preparing the second coating composition comprises:
dissolving a tin compound in an alcoholic solvent.

7. The method of claim 6, wherein the tin compound comprises $SnX_2$ or $SnX_4$, and X is one selected from the group consisting of I, Br, Cl and combinations thereof.

8. An electrochromic composition produced by a method of claim 1, and comprising:

$Cs_2SnX_yZ_{6-y}$ wherein X and Z are each independently one selected from the group consisting of I, Br, Cl and combinations thereof, and y satisfies 0<y<6.

9. The electrochromic composition of claim 8, wherein the electrochromic composition is formed in a solution or a film.

10. An electrochromic device, comprising:
   an electrochromic layer including an electrochromic composition of claim 8; and
   a transparent conductive layer located on one or each of opposite sides of the electrochromic layer.

11. A method of producing an electrochromic composition, comprising:
   preparing, respectively, a first coating composition comprising a first electrochromic compound and a second coating composition comprising a second electrochromic compound;
   loading, respectively, the first coating composition and the second composition into an electro-spray machine;
   spraying the first coating composition and the second coating composition under application of a voltage to the electro-spray machine; and
   forming a electrochromic composition by reacting the first electrochromic compound with the second electrochromic compound during spraying,
   wherein a spraying rate of the first coating composition is 10 to 70 µl/m, and
   a spraying rate of the second coating composition is 10 to 70 µl/m.

12. A method of producing an electrochromic composition, comprising:
   preparing, respectively, a first coating composition comprising a first electrochromic compound and
   a second coating composition comprising a second electrochromic compound;
   loading, respectively, the first coating composition and the second composition into an electro-spray machine;
   spraying the first coating composition and the second coating composition under application of a voltage to the electro-spray machine; and
   forming a electrochromic composition by reacting the first electrochromic compound with the second electrochromic compound during spraying,
   wherein the applied voltage is 8 to 16 kV.

* * * * *